United States Patent
Mateosky et al.

(10) Patent No.: US 7,962,049 B2
(45) Date of Patent: Jun. 14, 2011

(54) SYSTEMS AND METHODS FOR COMMUNICATION SYSTEM CONTROL UTILIZING CORRECTED FORWARD ERROR CORRECTION ERROR LOCATION IDENTIFIERS

(75) Inventors: John P. Mateosky, West River, MD (US); Michael Y. Frankel, Baltimore, MD (US); Jean-Luc Archambault, Severna Park, MD (US)

(73) Assignee: Ciena Corporation, Linthicum, MD (US)

( * ) Notice: Subject to any disclaimer, the term of this patent is extended or adjusted under 35 U.S.C. 154(b) by 799 days.

(21) Appl. No.: 11/954,980

(22) Filed: Dec. 12, 2007

(65) Prior Publication Data

US 2009/0154941 A1 Jun. 18, 2009

(51) Int. Cl.
*H04B 10/06* (2006.01)

(52) U.S. Cl. ...................................................... 398/208

(58) Field of Classification Search .......... 398/101–102, 398/158, 185–186, 189, 192, 208–209
See application file for complete search history.

(56) References Cited

U.S. PATENT DOCUMENTS

| | | | | |
|---|---|---|---|---|
| 7,574,146 B2 * | 8/2009 | Chiang et al. | ................. | 398/209 |
| 2004/0228635 A1 * | 11/2004 | Price | ............................ | 398/149 |
| 2006/0127100 A1 * | 6/2006 | Frankel et al. | ................ | 398/158 |

* cited by examiner

*Primary Examiner* — Leslie Pascal
(74) *Attorney, Agent, or Firm* — Clements Bernard PLLC; Christopher L. Bernard; Jeffrey M. Measures

(57) ABSTRACT

The present invention provides systems and methods for communication system control utilizing corrected forward error correction (FEC) error location identifiers in multi-level modulation scheme systems. The present invention utilizes precise error correction information, available for each FEC block of a particular code (including, but not limited to, block codes and concatenated block codes employing iterative decoding as well as convolutional codes (including turbo codes) and low-density parity-check code (LDPC) class codes) used (e.g., Bose, Ray-Chaudhuri, Hocquenghem (BCH), Reed-Solomon, etc.), as a result of the FEC decoding process to provide feedback to close the loop for control of a demodulator (i.e., receiver). Each error location can be uniquely traced back to a particular sub-rate signal path, with running, post-FEC corrected BER (bit error rate) calculations generated on each sub-rate signal. Advantageously, this provides the ability to adjust thresholds and various other parameters to achieve and maintain error-free operation quickly.

18 Claims, 2 Drawing Sheets

SYSTEMS AND METHODS FOR COMMUNICATION SYSTEM CONTROL UTILIZING CORRECTED FORWARD ERROR CORRECTION ERROR LOCATION IDENTIFIERS

FIELD OF THE INVENTION

The present invention relates generally to communication systems. More specifically, the present invention relates to communication system control utilizing corrected forward error correction (FEC) error location identifiers in multi-level modulation scheme systems.

BACKGROUND OF THE INVENTION

Communication systems utilize various modulation schemes depending on the particular medium, bandwidth, and information signal. To increase spectral efficiency, many communication systems utilize multi-level modulation schemes. For example, wireless, copper-based, and other communication systems can utilize orthogonal frequency-division multiplexing (OFDM), quadrature amplitude modulation (QAM), quadrature phase shift keying (QPSK), polarization multiplexing, and the like. Each of these modulation schemes transmits multiple bits per symbol. For example, QPSK scheme is attractive as it transmits two bits per symbol, thereby reducing signal baud (i.e. symbol) rate by a factor of two.

With regard to optical communication systems, high data rate signals, such as 10 Gb/s and 40 Gb/s, are conventionally used. These utilize a binary modulation scheme, e.g. on-off keying. Disadvantageously, binary modulation schemes provide a very poor spectral efficiency and limit overall transmission system utilization in wavelength division multiplexed (WDM) networks.

Continuing rapid growth in network bandwidth requirements is pushing single channel data rates towards ever increasing speeds. For example, current standards bodies are pursuing data rates of 100 Gb/s, which would require even higher transmission rates (i.e. ~112 Gb/s), once FEC and Framing overheads are considered. Other standards are considering data rates of 120 Gb/s, again requiring even higher transmission rate (i.e. ~130 Gb/s) once FEC and Framing overhead is added. Disadvantageously, such high data rates are beyond current limits of the electronics and optics using a direct binary modulation scheme.

Accordingly, optical communication systems are moving towards multi-level modulation schemes to improve spectral efficiency and to reduce the demands on the system electronics and optics. In particular, a Differential-QPSK (DQPSK) scheme is attractive as it transmits two bits per symbol, thereby reducing signal baud (i.e. symbol) rate by a factor of two. At the same time, tolerance to chromatic dispersion is increased and corresponds to the reduced baud rate (not bit rate) of the signal. Additionally, demands on the bandwidth of electronic components are also reduced corresponding to the baud rate, and not bit rate of the signal. Multi-level amplitude modulation is also possible for optical communication systems, but is not very attractive for optical communication as it does not provide a high separation between adjacent levels, and is susceptible to noise. A combination of both Amplitude and Phase modulation is also possible, and can be generalized as optical QAM modulation scheme.

A feature common to all multi-level modulation schemes is the splitting of the incoming data bit stream into sub-rate (baud-rate) data stream for subsequent modulation, transmission, and reception. At the same time, data processing, such as FEC encoding and decoding, is advantageously performed on the full bit rate signal. This arises due to the fact that sub-rate data streams driving optical modulator are correlated, and not independent. Hence, whatever additional bit manipulation (i.e. FEC) occurs, it must happen before the parallel sub-rate driving signals are generated.

Disadvantageously, multi-level modulation schemes, such as DQPSK, require a more complex receiver design. Generally, optical multi-level receivers require an ability to dynamically control various demodulation blocks, such as optical and electrical demodulation blocks. For example, these receivers also generally require tunable optical chromatic and polarization-mode dispersion compensation for high-data rate signals. Typically, this compensation is applied to a composite signal at full bit-rate. Other demodulation blocks, such as Delay Line Interferometers (DLI) as are required for DQPSK modulation formats, are applied to individual sub-rates (i.e., symbol) signals. Multi-level amplitude modulation formats require threshold-based level differentiation applied to the composite signal. Receiver-based electronic distortion compensation, as well as amplitude and phase decision thresholds can also be applied to the individual sub-rate signals.

Depending on the particulars of the demodulation block and modulation format, dynamic control of various settings can be accomplished by signal monitoring mechanisms that look at some easily measured property. For example, tunable dispersion compensation (TDC) and polarization mode dispersion compensation (PMDC) blocks can be controlled by measuring radio frequency (RF) spectrum shape of the received signal, or some property related to the clock tones. PMDC can be further controlled based on Degree of Polarization measurement, or some other optical monitoring scheme as is known in the art. DLIs can be set based on relative powers of the dual outputs.

The goal of stabilization and dynamic control schemes is to achieve the lowest possible Bit Error Rate (BER) of the composite signal. As such, any indirect scheme that relies on optical, RF, power, or some other monitoring is only indirectly related to the BER. Such schemes can only achieve a coarse accuracy, and are susceptible to errors caused by multiple distortion effects that could be present at the same time.

Thus, a stabilization and dynamic control scheme is needed that links control directly to the BER of the received signal, allows for efficient start-up tuning, allows for fast and efficient operational tracking, and allows for independent BER monitoring and control of sub-rate components. Start-up conditions are especially onerous, as parameters can be so far from optimum as not to allow FEC frame locking and exhibit a corresponding infinite BER. The problem becomes a multi-dimensional blind parameter search until signal quality is sufficiently high to allow FEC framer locking. Existing schemes based on a composite signal BER monitoring are difficult to apply in cases where multiple parameters require tracking as well.

BRIEF SUMMARY OF THE INVENTION

In various exemplary embodiments, the present invention provides systems and methods for communication system control utilizing corrected forward error correction (FEC) error location identifiers in multi-level modulation scheme systems. The present invention utilizes precise error correction information, available for each FEC block of a particular error correction code (including, but not limited to, block codes and concatenated block codes employing iterative decoding as well as convolutional codes (including turbo codes) and low-density parity-check code (LDPC) class codes) used (e.g., Bose, Ray-Chaudhuri, Hocquenghem (BCH), Reed-Solomon, etc.), as a result of the FEC decoding process to provide feedback to close the loop for control of a demodulator (i.e., receiver). Each error location can be uniquely traced back to a particular sub-rate signal path, with running, post-FEC corrected BER (bit error rate) calculations generated on each sub-rate signal. Advantageously, this provides the ability to adjust receiver thresholds and various other parameters to achieve and maintain error-free operation quickly.

In an exemplary embodiment of the present invention, a receiver system utilizing corrected forward error location identifiers for system control includes a composite compensation block configured to provide compensation on a received composite signal, wherein the received composite signal utilizes a multi-level modulation format, and wherein the received composite signal includes a plurality of sub-rate signals; a demodulator configured to demodulate the received composite signal to the plurality of sub-rate signals; a forward error correction decoder configured to identify error locations and correct errors in the received composite signal; and a controller configured to adjust parameters of the composite compensation block and parameters associated with each sub-rate signal in the demodulator responsive to identified error locations and corrected errors. Optionally, the received composite signal is encoded with a linear block error correction code including one of Bose Ray-Chaudhuri Hocquenghem (BCH), Reed-Solomon, Hamming, Golay, and a combination thereof. The controller is configured to perform coarse adjustments of the composite compensation block and the demodulator at start-up to provide forward error correction frame locking. The controller is configured to continually adjust the composite compensation block and the demodulator responsive to identified error locations and corrected errors following forward error correction frame locking. Alternatively, the received composite signal includes an optical signal; and the composite compensation block includes tunable dispersion compensation and polarization mode dispersion compensation. Optionally, the multi-level modulation format includes quadrature phase shift keying, the demodulator includes one or more delay line interferometers, and the controller is configured to adjust phase in the one or more delay line interferometers responsive to identified error locations and corrected errors. Alternatively, the receiver system further includes a sub-rate optical splitter configured to split the plurality of sub-rate signals. Optionally, the received composite signal is encoded with one of a concatenated block code employing iterative decoding, a convolutional code, and a low-density parity-check code.

In another exemplary embodiment of the present invention, a receiver control method utilizing corrected forward error location identifiers includes powering up a receiver; initializing control parameters for one or more control loops; performing one or more control loops; monitoring forward error correction on a composite received signal; adjusting the control parameters with a coarse adjustment if the forward error correction is not framed locked; acquiring sub-rate bit error correction information from the monitored forward error correction; and adjusting the control parameters with an adjustment responsive to the sub-rate bit error correction information. Optionally, the receiver control method further includes repeating the monitoring, adjusting, acquiring, and adjusting steps to provide continual receiver control. Alternatively, the forward error correction includes a linear block error correction code including one of Bose Ray-Chaudhuri Hocquenghem (BCH), Reed-Solomon, Hamming, Golay, and a combination thereof. The sub-rate bit error correction information is acquired based on error location identifiers in the linear block error correction code. Optionally, the receiver includes an optical differential phase shift keying receiver, and the one or more control loops include a first control loop configured to set tunable dispersion compensation, a second control loop configured to control a polarization mode dispersion compensator, and a third control loop configured to set phase for one or more delay line interferometers.

In yet another exemplary embodiment of the present invention, an optical communication system with a multi-level modulation format, wherein the optical communication system is configured to utilize corrected forward error location identifiers for system control includes a forward error correction encoder; modulation scheme adaptation configured to receive an output from the forward error correction encoder and to format the output according to the multi-level modulation format; an optical modulator configured to modulate an optical signal with an output from the modulation scheme adaptation; a composite optical compensation block receiving the optical signal from a fiber optic link; a demodulator configured to receive a compensated optical signal from the composite optical compensation block, wherein the demodulator is configured to demodulate the compensated optical signal responsive to the multi-level modulation format; a forward error correction decoder receiving a demodulated signal from the demodulator, wherein the forward error correction decoder is configured to identify error locations and correct errors in the demodulated signal; and a controller configured to adjust parameters associated with the composite optical compensation block and the demodulator responsive to identified error locations and corrected errors. Optionally, the forward error correction encoder utilizes a linear block error correction code including one of Bose Ray-Chaudhuri Hocquenghem (BCH), Reed-Solomon, Hamming, Golay, and a combination thereof. The controller is configured to perform coarse adjustments of the composite optical compensation block and the demodulator at start-up to provide forward error correction frame locking. Also, the controller is configured to continually adjust the composite optical compensation block and the demodulator responsive to identified error locations and corrected errors following forward error correction frame locking. Optionally, the composite optical compensation block includes tunable dispersion compensation and polarization mode dispersion compensation; the multi-level modulation format includes differential quadrature phase shift keying; the demodulator includes one or more delay line interferometers; and the controller is configured to adjust phase in the one or more delay line interferometers responsive to identified error locations and corrected errors. Alternatively, the forward error correction encoder is configured to encode individual sub-rate signals based on the multi-level modulation format.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for communication system control utilizing corrected forward error correction (FEC) error location identifiers in multi-level modulation scheme systems. The present invention utilizes precise error correction information, available for each FEC block of a particular error correction code as a result of the FEC decoding process to provide feedback to close the loop for control of a demodulator (i.e., receiver). Each error location can be uniquely traced back to a particular sub-rate signal path, with running, post-FEC corrected BER (bit error rate) calculations generated on each sub-rate signal. Advantageously, this provides the ability to adjust receiver thresholds and various other parameters to achieve and maintain error-free operation quickly.

Figure 1:
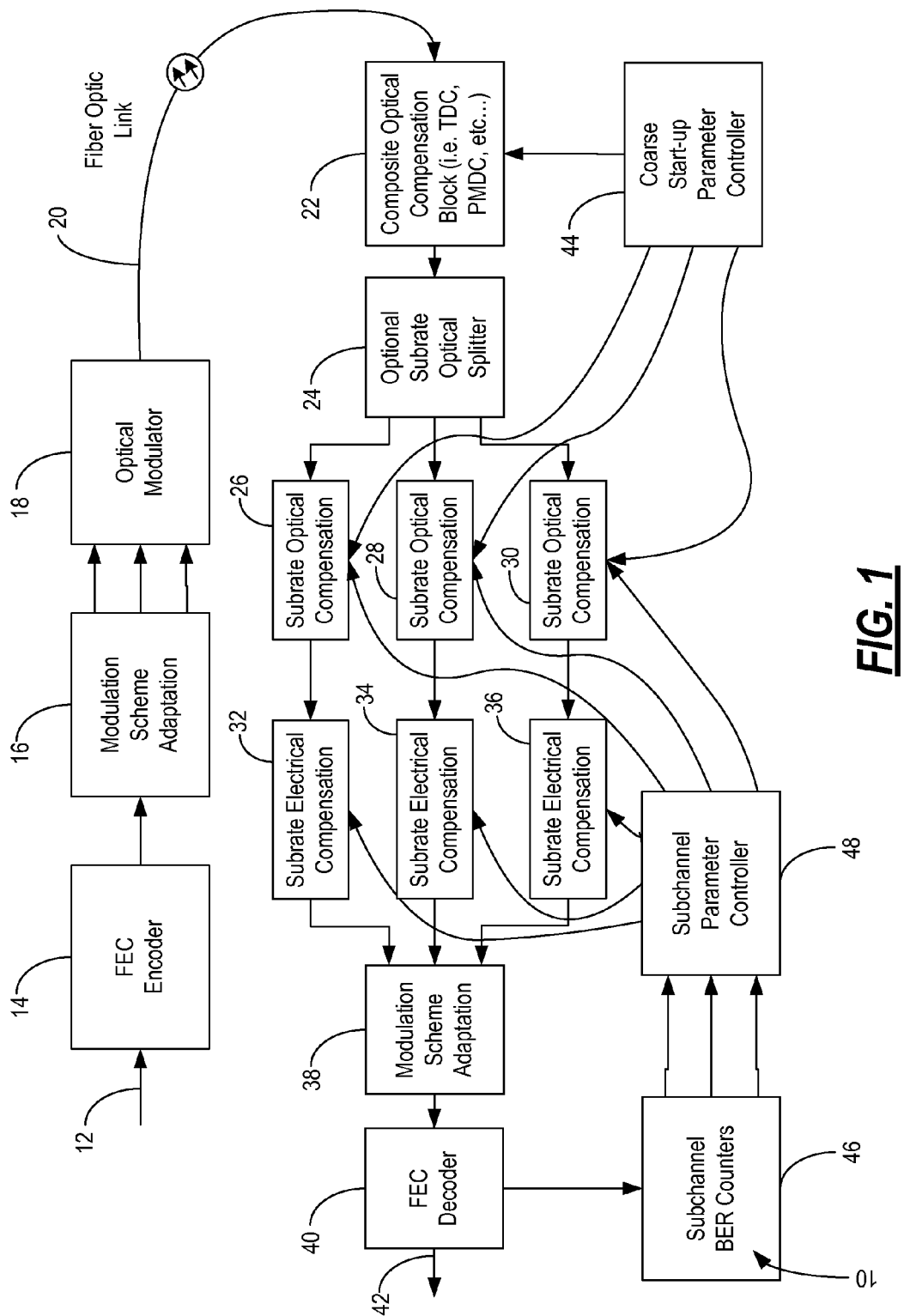
FIG. 1 is a block diagram of a multi-level modulation communication system according to an exemplary embodiment of the present invention.

Referring to FIG. 1, a block diagram of a multi-level modulation communication system 10 is depicted according to an exemplary embodiment of the present invention. For illustration purposes, the communication system 10 is illustrated as an optical communication system. Those of ordinary skill in the art will recognize the present invention can also be utilized in other types of multi-level modulation systems which employ FEC at the system's bit-rate or at individual sub-rates, and transmit at a lower symbol rate, or baud rate, due to the user of a multi-level modulation scheme. The multi-level modulation communication system 10 includes various blocks representing system components and their related functionality according to an exemplary embodiment of the present invention. Those of ordinary skill in the art will recognize additional components may be included, and are omitted for illustration purposes.

In an exemplary embodiment, the communication system 10 can include an optical DQPSK system with a system bit-rate of 40 Gb/s or 100 Gb/s and a corresponding system baud rate of 20 Gb/s or 50 Gb/s, respectively. An input signal 12 is provided to a FEC encoder 14. The input signal 12 can include a data signal, such as 40 Gb/s or 100 Gb/s. Additionally, the input signal 12 can included framing, such as SONET/SDH, Optical Transport Network (OTN), and the like.

The FEC encoder 14 is configured to encode the input signal 12 with forward error correction overhead data. FEC utilizes redundant data which can be used at a receiver to decode received data and correct any errors which occur during transmission. With regard to optical communications, FEC enables improved performance, error monitoring, error locating, and the like. For example, the FEC encoder 14 can utilize a linear block code, such as BCH, Reed-Solomon, Golay, Hamming, and the like, concatenated block codes employing iterative decoding, convolutional codes (including turbo codes), and LDPC class codes.

After the input signal 12 is encoded with FEC in the FEC encoder 14, a modulation scheme adaptation block 16 prepares the FEC encoded signal for modulation. For example, in DQPSK, the modulation scheme adaptation block 16 includes a DQPSK precoder which precodes the encoded input signal into an in-phase data stream (I-data) and a quadrature data stream (Q-data). The modulation scheme adaptation block 16 is dependent on the specific multi-level modulation format utilized, i.e., the block 16 is different for DQPSK from QAM, etc. For example, the system 10 is illustrated with three outputs from the modulation scheme adaptation block 16, representing a three-bit modulation scheme. For DQPSK, the block 16 has two outputs for I-data and Q-data.

The outputs of the modulation scheme adaptation block 16 are utilized to drive a modulator, such as an optical modulator 18. The optical modulator 18 performs signal modulation of a carrier signal, such as a laser. For example, the optical modulator 18 can include a Lithium Niobate ($LiNbO_3$) Mach-Zehnder interferometer, and the like. The carrier signal can be provided through a distributed feedback laser (DFB) or the like. The output of the modulator 18 is input into a fiber optic link 20. Alternatively, the output can be provided to a multiplexer for WDM transmission along with other components, such as dispersion compensation modules, optical amplifiers, and the like. Generally, the components 14, 16, 18 are located with a transmitter.

The fiber optic link 20 connects the transmitter to a receiver over a distance. Typically, distances can range from intra-office (e.g., meters) to long-haul (e.g., thousands of kilometers). The fiber optic link 20 can include intermediate optical amplifiers, optical repeaters, and the like (not shown). The receiver can also include various components, such as optical amplifiers, demultiplexers, and the like (not shown).

At the receiver, the multi-level modulation communication system 10 includes a composite optical compensation block 22. For example, this can include a tunable dispersion compensator (TDC), a dynamic polarization mode dispersion compensator (PMDC), and the like configured to provide composite compensation across the received composite optical signal. The TDC can include fiber Bragg gratings, Gires-Tournois interferometers, lattice filters, and the like. The PMDC can include multiple polarization controllers and the like.

Optionally, a sub-rate optical splitter 24 is included following the composite optical compensation block 22. The optical splitter 24 can include a polarization beam splitter or the like. For example, the modulation scheme adaptation block 16 and the optical modulator 18 can include polarization multiplexing in addition to DQPSK or the like. Polarization multiplexing improves spectral efficiency and reduces the demands on system electronics and optics by using both orthogonal polarizations of optical signals. Alternatively, for a DQPSK system or the like without polarization multiplexing, the sub-rate optical splitter 24 can be simple couplers, providing copies of the optical signal to the subsequent DLI demodulators tuned to a particular quadrature (I or Q).

Following the sub-rate optical splitter 24, or if it is omitted following the composite optical compensation block 22, sub-rate optical signals are broken out from the received optical signal and sent to sub-rate optical compensation blocks 26, 28, 30. Following the sub-rate optical compensation blocks 26, 28, 30, the sub-rate optical signals are converted to electrical signals and receive compensation through sub-rate electrical compensation blocks 32, 34, 36.

Collectively, the sub-rate optical compensation blocks 26, 28, 30 and the sub-rate electrical compensation blocks 32, 34, 36 provide compensation of various parameters associated with the particular sub-rate signal. For example, these parameters can include electronic distortion compensation, modification of amplitude and phase decision thresholds, DLI adjustments, mixing of optical signals with local optical oscillators, and the like.

The outputs of the optical compensation blocks 26, 28, 30 and electrical compensation blocks 32, 34, 36 are input into a modulation scheme adaptation block 38. The block 38 is configured to perform demodulation and recombination of the various sub-rate optical signals to provide a composite received signal. For example, the block 38 can include demodulators, serializers/deserializers (SERDES), and the like. The modulation scheme adaptation block 38 provides the composite received signal to a FEC decoder 40.

The FEC decoder 40 is configured to decode the composite received signal based on the FEC coding scheme to provide error correction. The FEC decoder 40 using block or cyclic codes first detects errors, locates the errors, and then corrects the errors. For example, using a RS-type code, the FEC decoder 40 detects errors by computing syndromes associated with the composite received signal, locates the errors by computing an error locator polynomial, and corrects the errors by computing an error polynomial and performing an action, such as an exclusive OR, with the composite received signal. Once decoded, a correct signal 42 is provided as an output.

In various exemplary embodiments, the present invention provides a solution to both fast start-up and fast-response tracking problems associated with multi-level modulation optical signals. A start-up condition is achieved by providing parameter controls from a coarse start-up parameter controller 44 that achieves FEC locking either by design (i.e., stable, open loop block parameter operation), or via FEC-independent monitoring and control. Here, the initial start-up controls are only coarse and sufficient to achieve FEC framer locking. The coarse start-up parameter controller 44 is configured to provide coarse feedback to the composite optical compensation block 22, such as to initially set TDC and PMDC parameters, and to the sub-rate optical compensation blocks 26,28,30, such as to set demodulator phase and other optical parameters.

Once FEC framer locking is achieved, the system goes into a FEC-based BER tracking mode. The present invention uses precise error correction information, available for each FEC block of the particular linear block code used (e.g. BCH, Reed-Solomon, etc) as a result of the FEC decoding process to 'close-the-loop' or provide feedback to control the optical demodulator (receiver) in an attempt to assist in adjusting receiver thresholds and various other 'knobs' to achieve and maintain error-free operation quickly. For example, the FEC decoder 40 can provide details to sub-channel BER counters 46 to track error locations in each associated sub-rate signal. Here, the counters 46 maintain an error count associated with each sub-rate signal, not just the overall composite signal.

The present invention can apply to any communication system architecture which performs FEC at the system's bit-rate, and transmits at a lower symbol or baud rate due to a multi-level modulation scheme. In this case, the present invention uses the FEC decoder's 40 output, or the roots of the decoder's 40 error locator polynomial to determine all of a given block's errors and the location of those errors. By providing multiple counters 44 which operate on these error location vectors and shifted versions of those error vectors, the present invention can discern differences in BER performance between channels (e.g., I or Q demodulator legs for DQPSK).

The sub-channel BER counters 44 provide information related to error quantity and location to a sub-channel parameter control 48. The sub-channel parameter controller 48 is configured to control each sub-rate optical compensation block 26,28,30 and each sub-rate electrical compensation block 32, 34, 36 to control various parameters directly based on a real-time BER measurement of the respective sub-rate signal. Advantageously, the sub-channel parameter controller 48 can be used effectively to control receiver block parameters in real-time, allowing for critical and timely adjustments that would be needed to improve and/or maintain good receiver performance.

Advantageously, by providing a reliable mechanism to identify and establish the error-rate on each leg of a multi-level (e.g., DQPSK) receiver (e.g., I and Q demodulator legs), the present invention gives a designer of such complex optical receivers a powerful tool for isolating issues in each receiver leg chain and for providing feedback when adjustments are being made. This allows for a more automated and efficient tuning and 'turn-up' of the communication system 10.

Further, BER is the final parameter of interest to the communication system 10, and must be minimized to achieve optimal communication system 10 performance. All other criteria provide only an indirect measure of performance, and may lead to suboptimal system operation. Fine-tuning system performance using direct BER measurement allows for an intrinsically improved communication system 10 performance.

Figure 2:
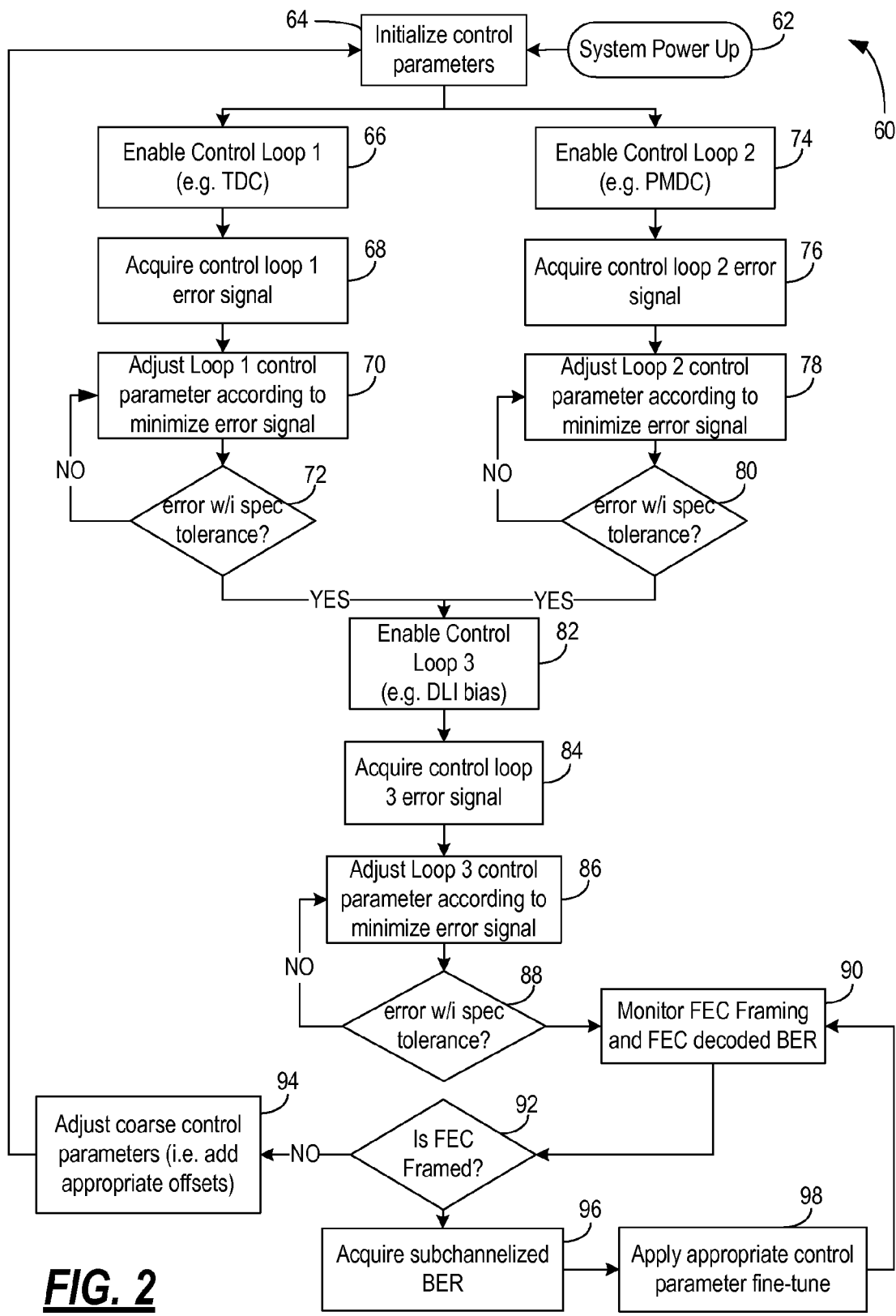
FIG. 2 is a flow chart illustrating a communication system power-up to continual fine-tuning operation according to an exemplary embodiment of the present invention.

Referring to FIG. 2, a flowchart of a communication system power-up to continual fine-tuning operation 60 is depicted according to an exemplary embodiment of the present invention. In this exemplary operation 60, three control loops are illustrated, including a TDC, PMDC, and DLI phase control loop. These three loops are used for controlling an optical DQPSK receiver. Those of ordinary skill in the art will recognize that these three loops are presented for illustration purposes, and additional loops can be utilized for control of other parameters that may be required.

First, the system is powered up (step 62). Control parameters are initialized for the control loops (step 64). For example, this can include providing initial settings to the TDC, PMDC, and DLI phase adjustment systems from the coarse start-up parameter controller 44. Next, the operation 60 performs the first and second control loops in parallel, e.g. the TDC and PMDC control loops.

The first control loop is enabled (step 66). For example, the first control loop can include setting the TDC. An error signal for the first control loop is acquired (step 68). The first control loop adjusts parameters according to minimizing the error signal (step 70). The resulting error is checked to see if it is within a predetermined specification tolerance (step 72). If not, the operation 60 continues to adjust parameters to minimize the error signal (step 70). If it is within tolerance, the first control loop is completed for this iteration.

The second control loop is enabled (step 74). For example, the second control loop can include setting the PMDC. An error signal for the second control loop is acquired (step 76). The second control loop adjusts parameters according to minimizing the error signal (step 78). The resulting error is checked to see if it is within a predetermined specification tolerance (step 80). If not, the operation 60 continues to adjust parameters to minimize the error signal (step 78). If it is within tolerance, the second control loop is completed for this iteration.

Following completion of the first and second control loops, a third control loop is enabled (step 82). For example, the third control loop can include setting DLI phase. An error signal for the third control loop is acquired (step 84). The third control loop adjusts parameters according to minimizing the error signal (step 86). The resulting error is checked to see if it is within a predetermined specification tolerance (step 88). If not, the operation 60 continues to adjust parameters to minimize the error signal (step 86). If it is within tolerance, the third control loop is completed for this iteration.

Following completion of the third control loops, FEC framing and FEC decoded BER is monitored (step 90). For example, this can be performed by the FEC decoder 40, the sub-channel BER counters 46, and the sub-channel parameter controller 48. The FEC is checked to see if it is framed (step 92). For example, at start-up, the communication system may not have FEC frame locking yet. Additionally, the communication system may lose FEC frame locking during fast-response events.

Accordingly, if the FEC is not framed, the operation 60 adjusts coarse control parameters by adding appropriate offsets (step 94), and reruns the three control loops by returning to step 64. For example, the operation 60 can add additional offsets to the TDC, PMDC, and DLI phase to get FEC frame locking through the three control loops. The purpose of these additional offsets is to provide coarse control, i.e. adjustments to get FEC frame locking.

If the FEC is framed (step 92), then sub-channelized BER is acquired for each sub-rate signal (step 96). Here, the present invention utilizes the BER and error location identifiers, such as from the FEC decoder 40, the sub-channel BER counters 46, and the sub-channel parameter controller 48. Accordingly, appropriate control parameter fine-tuning can be applied based on the sub-channel BER and error location identifiers (step 96). Also, the operation 60 can return to step 90 to continually monitor FEC framing and FEC decoded BER to provide continuous parameter adjustment based on actual errors.

The present invention is also applicable to systems where the individual sub-rate signals or channels can be separately FEC encoded (and decoded) and framed (step 92). This is in contrast to FEC encoding the composite signal. Either approach utilizes the BER and error location identifiers, from the FEC decoder 40, the channel BER counters 46, and the channel parameter controller 48. Accordingly, appropriate control parameter fine-tuning can be applied based on the sub-channel BER and error location identifiers (step 96). Also, the operation 60 can return to step 90 to continually monitor FEC framing and FEC decoded BER to provide continuous parameter adjustment based on actual errors.

The operation 60 provides a stabilization and dynamic control scheme that directly links control to BER of a received signal. This can be used for efficient start-up tuning, for fast and efficient operational tracking, and for independent BER monitoring and control of sub-rate components. In an exemplary embodiment, the operation 60 can be utilized in a DQPSK optical receiver to identify and establish an error-rate on each of the I and Q legs of the receiver. Also, since BER is the final and most useful parameter of interest to the communication system, the system can achieve optimal performance through monitoring and minimizing the BER.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A receiver system utilizing corrected forward error location identifiers for system control, comprising:
    a composite compensation block configured to provide compensation on a received composite signal, wherein the received composite signal utilizes a multi-level modulation format, and wherein the received composite signal comprises a plurality of sub-rate signals;
    a demodulator configured to demodulate the received composite signal to the plurality of sub-rate signals;
    a forward error correction decoder configured to identify error locations and correct errors in the received composite signal; and
    a controller configured to adjust parameters of the composite compensation block and parameters associated with each sub-rate signal in the demodulator responsive to identified error locations and corrected errors, wherein the controller is configured to perform coarse adjustments of the composite compensation block and the demodulator at start-up to provide forward error correction frame locking.

2. The receiver system of claim 1, wherein the received composite signal is encoded with a linear block error correction code comprising one of Bose Ray-Chaudhuri Hocquenghem (BCH), Reed-Solomon, Hamming, Golay, and a combination thereof.

3. The receiver system of claim 1, wherein the received composite signal is encoded with one of a concatenated block code employing iterative decoding, a convolutional code, and a low-density parity-check code.

4. The receiver system of claim 1, wherein the controller is configured to continually adjust the composite compensation block and the demodulator responsive to identified error locations and corrected errors following forward error correction frame locking.

5. The receiver system of claim 1, wherein the received composite signal comprises an optical signal; and
    wherein the composite compensation block comprises tunable dispersion compensation and polarization mode dispersion compensation.

6. The receiver system of claim 5, wherein the multi-level modulation format comprises quadrature phase shift keying.

7. The receiver system of claim 6, wherein the demodulator comprises one or more delay line interferometers; and
    wherein the controller is configured to adjust phase in the one or more delay line interferometers responsive to identified error locations and corrected errors.

8. The receiver system of claim 1, further comprising a sub-rate optical splitter configured to split the plurality of sub-rate signals.

9. A receiver control method utilizing corrected forward error location identifiers, comprising:
    powering up a receiver;
    initializing control parameters for one or more control loops;
    performing one or more control loops;
    monitoring forward error correction on a composite received signal;
    adjusting the control parameters with a coarse adjustment if the forward error correction is not framed locked;
    acquiring sub-rate bit error correction information from the monitored forward error correction; and
    adjusting the control parameters with an adjustment responsive to the sub-rate bit error correction information.

10. The receiver control method of claim 9, further comprising repeating the monitoring, adjusting, acquiring, and adjusting steps to provide continual receiver control.

11. The receiver control method of claim 9, wherein the forward error correction comprises a linear block error correction code comprising one of Bose Ray-Chaudhuri Hocquenghem (BCH), Reed-Solomon, Hamming, Golay, and a combination thereof.

12. The receiver control method of claim 11, wherein the sub-rate bit error correction information is acquired based on error location identifiers in the linear block error correction code.

13. The receiver control method of claim 9, wherein the receiver comprises an optical differential phase shift keying receiver; and wherein the one or more control loops comprise a first control loop configured to set tunable dispersion compensation, a second control loop configured to control a polarization mode dispersion compensator, and a third control loop configured to set phase for one or more delay line interferometers.

14. An optical communication system with a multi-level modulation format, wherein the optical communication system is configured to utilize corrected forward error location identifiers for system control, comprising:

a forward error correction encoder, wherein the forward error correction encoder is configured to encode individual sub-rate signals based on the multi-level modulation format;

modulation scheme adaptation configured to receive an output from the forward error correction encoder and to format the output according to the multi-level modulation format;

an optical modulator configured to modulate an optical signal with an output from the modulation scheme adaptation;

a composite optical compensation block receiving the optical signal from a fiber optic link;

a demodulator configured to receive a compensated optical signal from the composite optical compensation block, wherein the demodulator is configured to demodulate the compensated optical signal responsive to the multi-level modulation format;

a forward error correction decoder receiving a demodulated signal from the demodulator, wherein the forward error correction decoder is configured to identify error locations and correct errors in the demodulated signal; and a controller configured to adjust parameters associated with the composite optical compensation block and the demodulator responsive to identified error locations and corrected errors.

15. The optical communication system of claim 14, wherein the forward error correction encoder utilizes a linear block error correction code comprising one of Bose Ray-Chaudhuri Hocquenghem (BCH), Reed-Solomon, Hamming, Golay, and a combination thereof.

16. The optical communication system of claim 14, wherein the controller is configured to perform coarse adjustments of the composite optical compensation block and the demodulator at start-up to provide forward error correction frame locking.

17. The optical communication system of claim 16, wherein the controller is configured to continually adjust the composite optical compensation block and the demodulator responsive to identified error locations and corrected errors following forward error correction frame locking.

18. The optical communication system of claim 14, wherein the composite optical compensation block comprises tunable dispersion compensation and polarization mode dispersion compensation;

wherein the multi-level modulation format comprises differential quadrature phase shift keying;

wherein the demodulator comprises one or more delay line interferometers; and wherein the controller is configured to adjust phase in the one or more delay line interferometers responsive to identified error locations and corrected errors.

\* \* \* \* \*